United States Patent
Tsirkin

(10) Patent No.: US 10,437,308 B2
(45) Date of Patent: Oct. 8, 2019

(54) PREDICTIVE VIRTUAL MACHINE HALT

(71) Applicant: Red Hat, Inc., Raleigh, NC (US)

(72) Inventor: Michael Tsirkin, Lexington, MA (US)

(73) Assignee: RED HAT, INC., Raleigh, NC (US)

( * ) Notice: Subject to any disclaimer, the term of this patent is extended or adjusted under 35 U.S.C. 154(b) by 206 days.

(21) Appl. No.: 15/614,002

(22) Filed: Jun. 5, 2017

(65) Prior Publication Data
US 2018/0348840 A1  Dec. 6, 2018

(51) Int. Cl.
| | |
|---|---|
| G06F 9/455 | (2018.01) |
| G06F 1/3228 | (2019.01) |
| G06F 1/3234 | (2019.01) |
| G06F 9/50 | (2006.01) |
| G06F 1/3293 | (2019.01) |

(52) U.S. Cl.
CPC .......... *G06F 1/3228* (2013.01); *G06F 1/3234* (2013.01); *G06F 1/3293* (2013.01); *G06F 9/45558* (2013.01); *G06F 9/5077* (2013.01); G06F 2009/45575 (2013.01); G06F 2009/45579 (2013.01)

(58) Field of Classification Search
None
See application file for complete search history.

(56) References Cited

U.S. PATENT DOCUMENTS

| | | |
|---|---|---|
| 9,122,508 B2 | 9/2015 | Gassert et al. |
| 2014/0082240 A1* | 3/2014 | Coleman ............... G06F 9/4812 710/260 |
| 2015/0055499 A1 | 2/2015 | Zheng et al. |
| 2015/0242229 A1 | 8/2015 | van Riel et al. |
| 2015/0339155 A1 | 11/2015 | Tsirkin |
| 2016/0306649 A1 | 10/2016 | Gunti et al. |
| 2016/0357602 A1 | 12/2016 | Sakai |

OTHER PUBLICATIONS

Tu et al., A Comprehensive Implementation and Evaluation of Direct Interrupt Delivery, Oracle Labs, Stony Brook University, Industrial Technology Research Institute, Taiwan, Mar. 14-15, 2015 (15 pages).

(Continued)

*Primary Examiner* — Gregory A Kessler
(74) *Attorney, Agent, or Firm* — K&L Gates LLP

(57) ABSTRACT

A system and method for predictive virtual machine halt includes a memory, a host central processing unit (CPU) in communication with the memory, a hypervisor executing on the host CPU, and a virtual machine executing on the hypervisor. The virtual machine includes a virtual central processing unit (VCPU) and a guest. In an example, the hypervisor starts executing the VCPU on the host CPU. When the hypervisor detects a request to stop executing the VCPU from the guest, the hypervisor starts a timer associated with the host CPU. A predetermined amount of time is set in the timer. Then, the hypervisor stops executing the VCPU and starts executing a task on the host CPU while the timer is running. When the hypervisor detects an expiration of the timer, the hypervisor stops executing the task on the host CPU and restarts executing the VCPU on the host CPU.

18 Claims, 6 Drawing Sheets

(56) References Cited

OTHER PUBLICATIONS

Amit et al., Bare-Metal Performance for Virtual Machines with Exitless Interrupts, Communications of the ACM, Jan. 2016, vol. 59, No. 1, pp. 108-116.
Understanding the Shutdown Delay setting for ESX hosts (1004421), Jul. 29, 2014 (2 pages) Link: https://kb.vmware.com/selfservice/microsites/search.do?language=en_US&cmd=displayKC&externalId=1004421.
Timekeeping in VMware Virtual Machines, VMware vSphere 5.0, Workstation 8.0, Fusion 4.0, Information Guide, Copyright 2011 VMware, Inc. (32 pages).

* cited by examiner

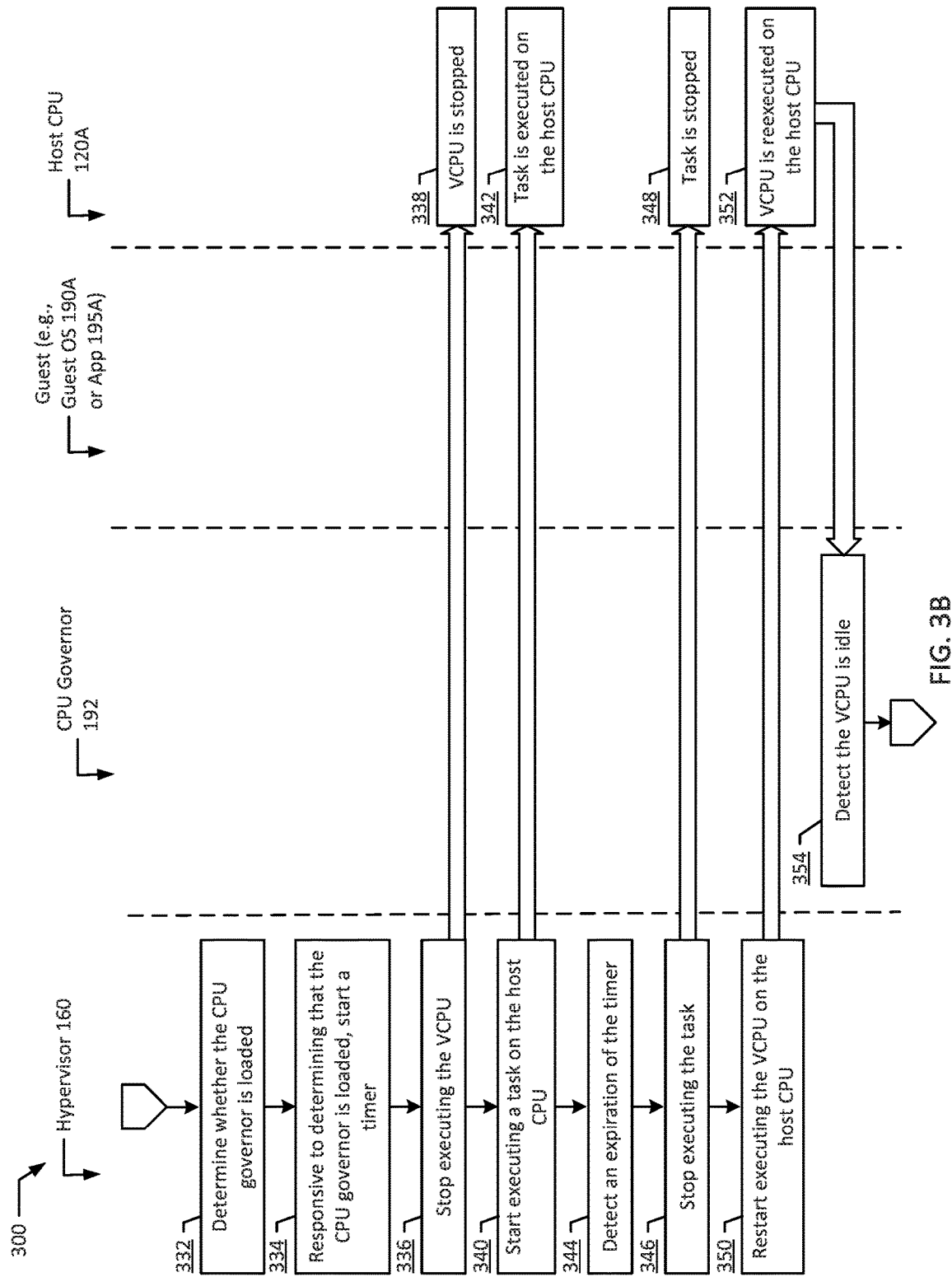

PREDICTIVE VIRTUAL MACHINE HALT

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system and methods for predictive virtual machine halt. In an example, a system includes a memory, a host central processing unit (CPU) in communication with the memory, a hypervisor executing on the host CPU, and a virtual machine executing on the hypervisor. The virtual machine includes a virtual central processing unit (VCPU) and a guest. In an example, the hypervisor starts executing the VCPU on the host CPU. When the hypervisor detects a request to stop executing the VCPU from the guest, the hypervisor starts a timer associated with the host CPU. A predetermined amount of time is set in the timer. Then, the hypervisor stops executing the VCPU and starts executing a task on the host CPU while the timer is running. When the hypervisor detects an expiration of the timer, the hypervisor stops executing the task on the host CPU and restarts executing the VCPU on the host CPU.

Additional features and advantages of the disclosed method and apparatus are described in, and will be apparent from, the following Detailed Description and the Figures.

BRIEF DESCRIPTION OF THE FIGURES

FIGS. 3A, 3B, and 3C are a flow diagram illustrating an example process for predictive virtual machine halt according to an example of the present disclosure.

DETAILED DESCRIPTION OF EXAMPLE EMBODIMENTS

Figure 1:
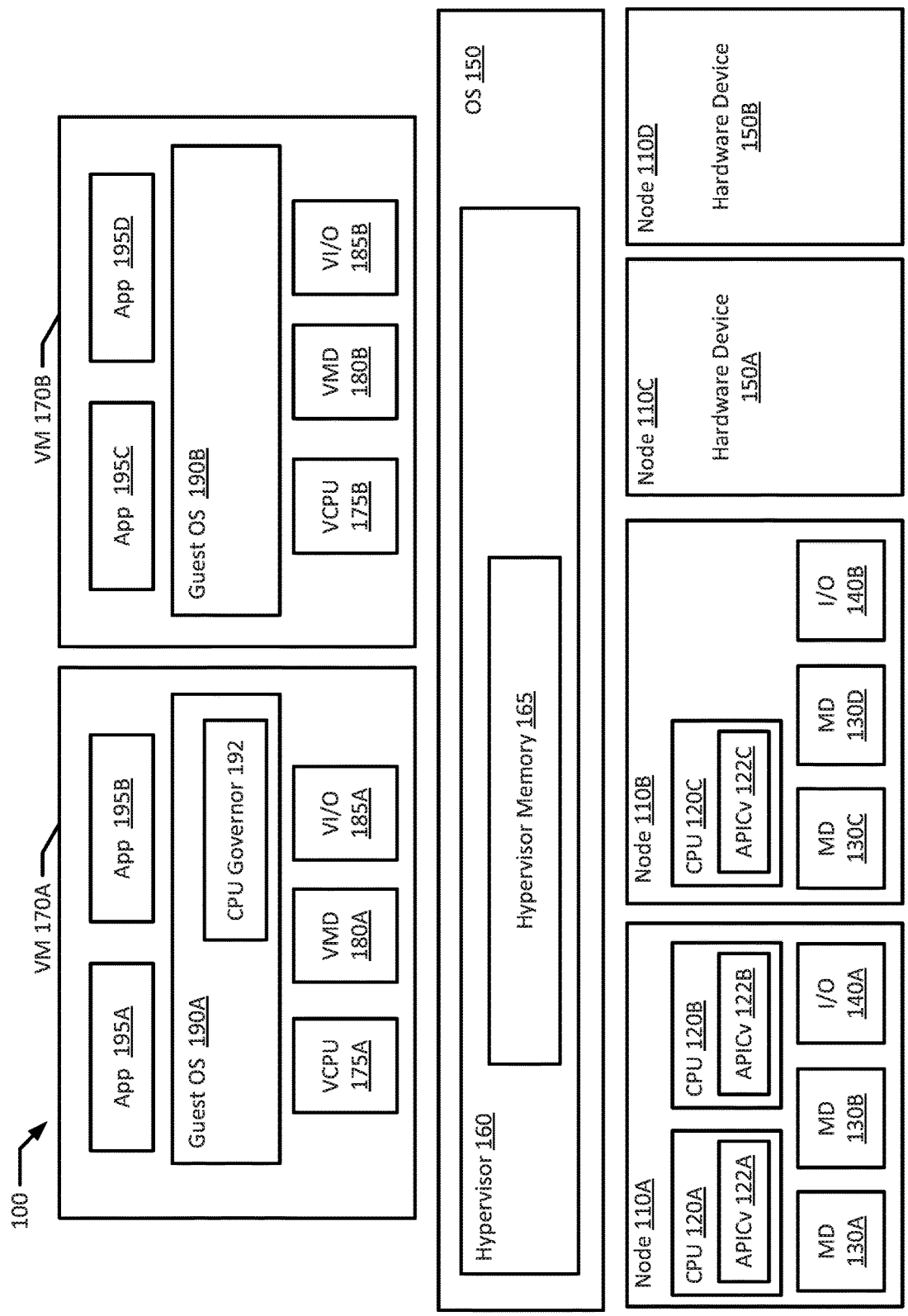
FIG. 1 is a block diagram of an example computer system according to an example of the present disclosure.

Described herein are methods and systems for predictive virtual machine halt. Generally, when a virtual central processing unit (VCPU) of a virtual machine has no tasks to process and is in an idle state, a guest of the virtual machine may send a request to halt the VCPU to the hypervisor, which may cause a virtual machine (VM) exit to the hypervisor. That is, the physical processor on which the guest/VCPU was running may be switched from a guest mode to a hypervisor mode after the guest issues the halt request. Then, the hypervisor may halt the VCPU and run another task (e.g., another VCPU) on the physical processor on which the halted VCPU was running.

When an interrupt arrives for a guest, a hypervisor typically needs to virtualize guest access to interrupts and guest interrupts and this may require a VM exit and/or a VM reentry, which is one of the major sources of virtualization overhead. Some modern processors support a technique, such as Advanced Programmable Interrupt Controller virtualization (APICv), which enables the system to inject interrupts while staying in the guest mode without triggering a VM exit and/or a VM entry. However, if an interrupt arrives for the halted VCPU while another task is running on the host CPU, this advantage may be lost. That is, if an interrupt arrives for the halted VCPU, the hypervisor may need to stop the other task (e.g., another VCPU), which may cause another VM exit to the hypervisor, and reenter the guest mode to run the halted VCPU to process the interrupt, which may increase the latency of the system.

One way to reduce the latency of the system may be to reenter the virtual machine repeatedly as soon as the host CPU exits to the hypervisor due to the issuance of the VCPU halt request or to use an idle-polling technique where, when a VCPU becomes idle, instead of attempting to halt the VCPU by sending a halt request, a virtual machine guest of the VCPU stays in the guest mode and waits for an interrupt to arrive. Another way to reduce the latency of the system may be to use a paravirtualized idle CPU governor, which may prevent the guests from sending a request to halt a VCPU to the hypervisor when a new interrupt is expected to arrive soon. If the CPU governor predicts that a new interrupt will arrive for the subject VCPU within a target residency time, the guest may poll the VCPU for a while and wait for an interrupt for the VCPU to arrive instead of issuing a VCPU halt request. As used here, polling a VCPU by a guest may refer to a situation where the guest waits for an interrupt to arrive for the given VCPU while the VCPU keeps running on the same host CPU without issuing a VCPU halt request. In this way, the CPU governor may increase the chance that a new interrupt will arrive while the virtual machine is running, reducing the number of VM exits and entries, and thus, may be efficient in reducing latency in an interrupt-driven system.

Generally, these approaches may typically work well for a system triggering events (e.g., processor interrupts or device interrupts) at high frequency (e.g., streaming benchmark: triggering interrupts every microsecond). However, these approaches are not effective when the events are triggered at low frequency (e.g., ping pong benchmark: triggering interrupts every 20-30 microseconds). For example, the idle-polling technique or repeatedly reentering the virtual machine as soon as the host CPU exits to the hypervisor due to the issuance of the VCPU halt request may merely waste lots of CPU cycles of the host CPU because other tasks or VCPUs may not be able to run on the host CPU, and the host CPU effectively does nothing while doing the idle-polling and/or repeatedly reentering. In this case, when the interrupt arrives at low frequency, more CPU cycles would be wasted because the interval between the interrupts is longer. Even if the system uses the CPU governor, it may not be efficient for low frequency events because the interrupt may more likely arrive while the VCPU is halted and the host CPU is running another task.

Aspects of the present disclosure may address the above-noted deficiencies. In an example, a hypervisor may start executing a VCPU of a virtual machine on a host CPU. At a later time after the VCPU started executing on the host CPU, a CPU governor of the virtual machine may detect that the VCPU has entered into an idle state and may predict whether a new interrupt is expected to arrive within a target residency time. If the CPU governor predicts that the new interrupt is expected to arrive within the target residency time, the guest may poll the VCPU. However, if no interrupt arrives within the target residency time, the guest may issue a request to stop executing the VCPU to the hypervisor (e.g., HLT instruction).

If the CPU governor predicts that the new interrupt is not expected to arrive within the target residency time, the guest may issue a request to stop executing the VCPU to the hypervisor. If the guest issues the request to stop executing the VCPU to the hypervisor, the host CPU may switch from a guest mode to a hypervisor mode. Then, the hypervisor may detect the request to stop executing the VCPU. Responsive to detecting the request, the hypervisor may start a timer, which is associated with the host CPU. A predetermined amount of time may be set in the timer. In an example, the hypervisor may determine the predetermined amount of time heuristically based on the target residency time of the CPU governor. For example, the predetermined amount of time set in the timer may be the target residency time minus a VM exit time and/or a VM entry time. In an example, the target residency time may be a few microseconds and the VM exit time and/or the VM entry time may be about 1 μs.

After starting the timer, the hypervisor may stop executing the VCPU and start executing a task (e.g., another VCPU) on the host CPU while the timer is running. When the hypervisor detects an expiration of the timer, the hypervisor may stop executing the task running on the host CPU and may restart executing the VCPU on the host CPU.

The following example system shows how the present disclosure may work well with a low frequency event. In an example system, the target residency time of a CPU governor is 4 μs, the predetermined amount of time set in a timer is 2 μs, VM exit/entry time of a host CPU is 1 μs, and the frequency of an event is one interrupt per every 5 μs. When detecting that the VCPU becomes idle, the CPU governor may predict when a new interrupt will arrive. The CPU governor may predict that a new interrupt will arrive in approximately 5 μs, which is longer than the target residency time, 4 μs. Then, the guest may issue the VCPU halt request, causing a VM exit, which may take 1 μs. Then, the hypervisor may start the timer and execute another task on the host CPU for 2 μs. When detecting the expiration of the timer, the hypervisor may stop executing the task and reenter the virtual machine to restart executing the VCPU, which may take 1 μs. Since there is only 1 μs left now until the new interrupt to arrive, this time, the CPU governor may predict that a new interrupt will arrive within the target residency time and the guest may poll the VCPU. If the new interrupt arrives while the guest is polling the VCPU, the guest may be able to accept the interrupt while the host CPU is in the guest mode. In this way, aspects of the present disclosure may increase the chance that a new interrupt will arrive while the VCPU is running on the host CPU, reducing the number of VM exits or VM entries, particularly when the events are triggered at low frequency while still advantageously enabling other tasks to be executed when the guest is waiting for an interrupt. Accordingly, aspects of the present disclosure may efficiently address requirements for a system with demanding workloads, such as a latency-sensitive Network Function Virtualization system. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory (e.g., memory 130A-D) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-D may be divided into units referred to as pages. A page is a specific amount of contiguous memory that represents the smallest unit in which an operating system allocates for various purposes. A page of memory is a set range of addresses to which data can be stored. The operating system may swap pages from working memory to longer term storage such as a non-volatile storage.

Processors 120A-C may be interconnected using a variety of techniques, ranging from a point-to-point processor interconnect, to a system area network, such as an Ethernet-based network. Local connections within each node, including the connections between a processor 120A-B and a memory device 130A-B and between a processor 120A-B and an I/O device 140A, may be provided by one or more local buses of suitable architecture, for example, peripheral component interconnect (PCI). As used herein, a device of the OS 150, which may be referred to as a host device, may refer to CPU 120A-C, Memory 130A-D, I/O 140A-B, a software device, and/or a hardware device.

As noted above, computer system 100 may run multiple virtual machines (e.g., VM 170A-B) by executing a software layer (e.g., hypervisor 160) above the hardware and below the virtual machines 170A-B, as schematically shown in FIG. 1. The virtual machines (e.g., VM 170A-B) may be an interface to a guest of the virtual machines and may be executing on the hypervisor 160. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). Processor virtualization may be implemented by the hypervisor 160 scheduling time slots on one or more physical processors 120A-C such that from the guest operating system's perspective, those time slots are scheduled on a virtual processor 175A-B. The hypervisor 160 is provided with some memory referred to as hypervisor memory 165. Hypervisor memory 165 may correspond to physical pages in host memory 130A-D. Thus, a subset of the pages in host memory 130A-D may be specifically allocated for use by the hypervisor 160. The hypervisor 160 can use this memory to perform various tasks related to management of the virtual machines 170A-B. In an example, a virtual machine 170A-B may execute a guest operating system 190A-B, which may utilize the underlying VCPU 175A-B, VMD 180A-B, and VI/O devices 185A-B. One or more applications 195A-D may be running on a virtual machine 170A-B under the guest operating system 190A-B.

In an example, one or more guest operating systems (e.g., 190A) may include a CPU governor 192. The CPU governor 192 may be a driver of the guest OS 190A. The CPU governor 192 may prevent the guest (e.g., guest OS 190A, Applications 195A-B, or any firmware running within VM 170A) from sending a request to halt a VCPU (e.g., VCPU 175A) of the guest when an interrupt is expected to arrive within a target residency time. In an example, the CPU governor 192 may include an instruction which, when executed, predicts whether a new interrupt is expected to arrive within the target residency time. The CPU governor 192 may determine the target residency time based on a predetermined heuristic. In an example, the CPU governor 192 may be loaded when the virtual machine 170A is booted or when a VCPU 175A is added to the system. In another example, the CPU governor 192 may be loaded on demand, at random time instances, or at any other suitable time. In an example, the CPU governor 192 may be a paravirtualized idle CPU governor. In an example, some guest operating systems (e.g., 190B) may not include/load the CPU governor 192.

In an example, each of the CPUs 120A-C may include an advanced programmable interrupt controller virtualization (APICv) module 122A-C. APICv, which is provided by some Intel processors (e.g., Intel® Xeon® processors), is hardware virtualization of the Advanced Programmable Interrupt Controller (APIC). Generally, a hypervisor virtualizes guest access to interrupts and guest interrupts. However, this typically requires a VM exit and a VM reentry, which may be a main source of system overhead. The APICv module 122A-C may virtualize guest interrupts and guest access to interrupts in the hardware, not in the hypervisor, and thus, may reduce VM exits and VM reentries.

Figure 2:
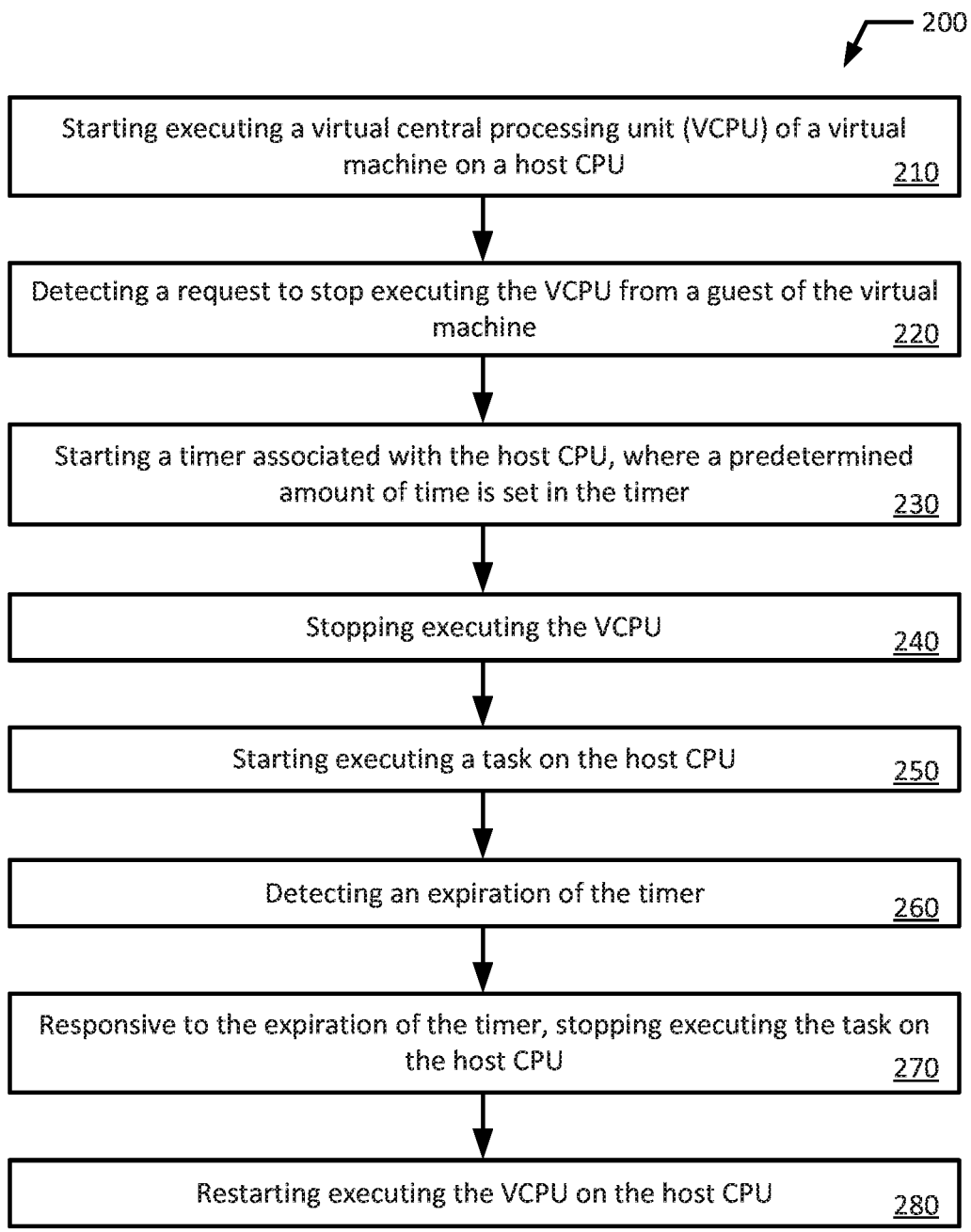
FIG. 2 is a flowchart illustrating an example process for predictive virtual machine halt according to an example of the present disclosure.

FIG. 2 shows a flowchart of an example method 200 for predictive virtual machine halt. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

In the illustrated example, a hypervisor executing on a host CPU may start executing a virtual central processing unit (VCPU) of a virtual machine on the host CPU (block 210). For example, a hypervisor 160 executing on a host CPU 120A may start executing a virtual central processing unit (VCPU) 175A of a virtual machine 170A on the host CPU 120A. At a later time, the hypervisor may detect a request to stop executing the VCPU from a guest of the virtual machine (block 220). For example, the hypervisor 160 may detect a request to stop executing the VCPU 175A from a guest of the virtual machine 170A. Then, the hypervisor may start a timer associated with the host CPU, where a predetermined amount of time is set in the timer (block 230). For example, the hypervisor 160 may start a timer associated with the host CPU 120A, where a predetermined amount of time is set in the timer. In an example, the timer may be a module in the host CPU 120A. In another example, the timer may be any timer, whether it is internal or external to the host CPU 120A, available to the host CPU 120A. Then, the hypervisor may stop executing the VCPU (block 240). For example, the hypervisor 160 may stop executing the VCPU 175A. Then, the hypervisor may start executing a task on the host CPU while the timer is running (block 250). For example, the hypervisor 160 may start executing a task on the host CPU 120A while the timer is running. In an example, the task may be an execution of another VCPU (e.g., VCPU 175B) or a disk task.

At a later time, the hypervisor may detect an expiration of the timer (block 260). For example, the hypervisor 160 may detect an expiration of the timer when a timer counts a predetermined quantity of clock cycles (e.g., counts down to zero or up to a threshold). Responsive to the expiration of the timer, the hypervisor may stop executing the task running on the host CPU (block 270). For example, responsive to the expiration of the timer, the hypervisor 160 may stop executing the task running on the host CPU 120A. Then, the hypervisor may restart executing the VCPU on the host CPU (block 280). For example, the hypervisor 160 may restart executing the VCPU 175A on the host CPU 120A.

Figure 3A:
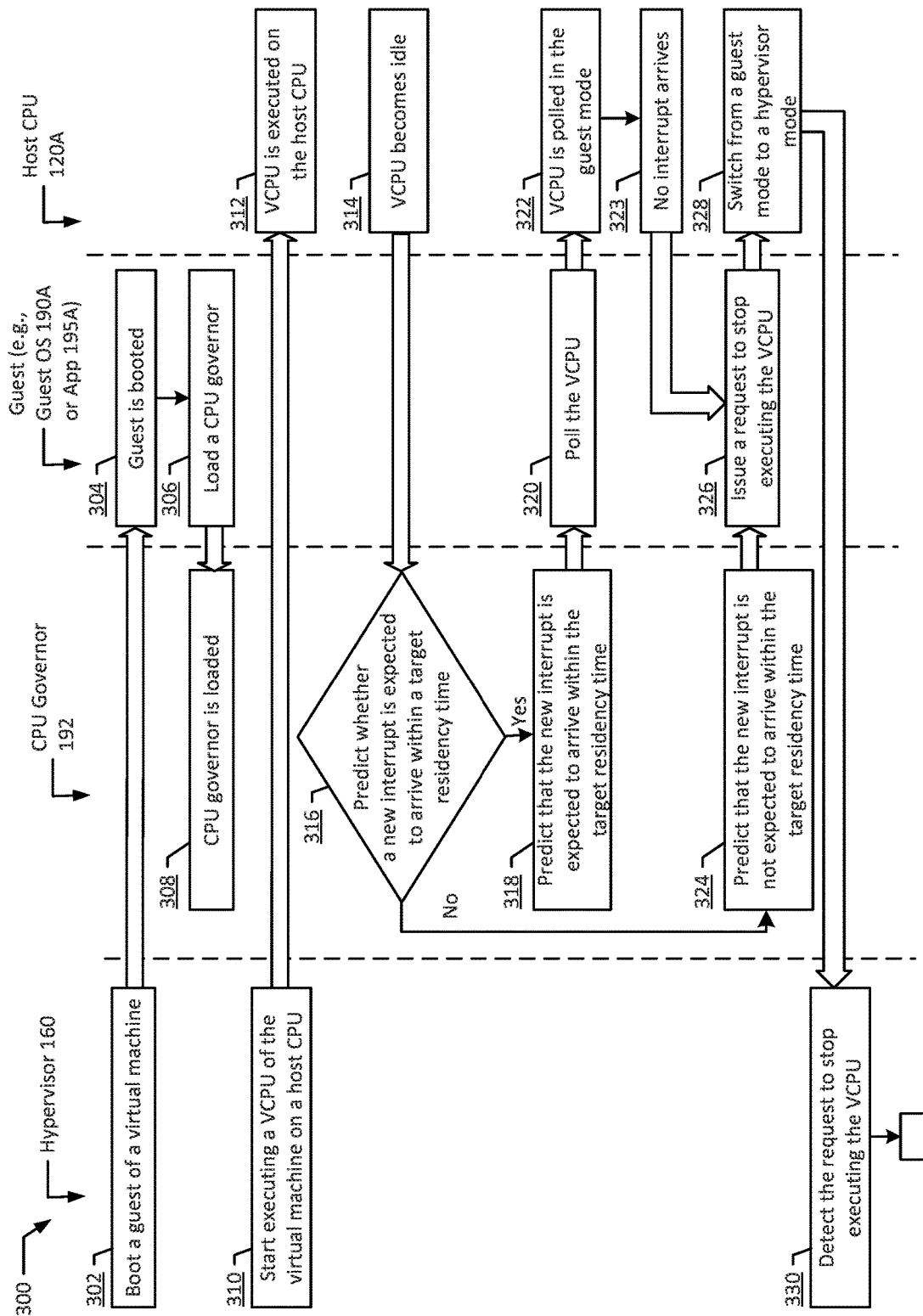
Figure 3C:
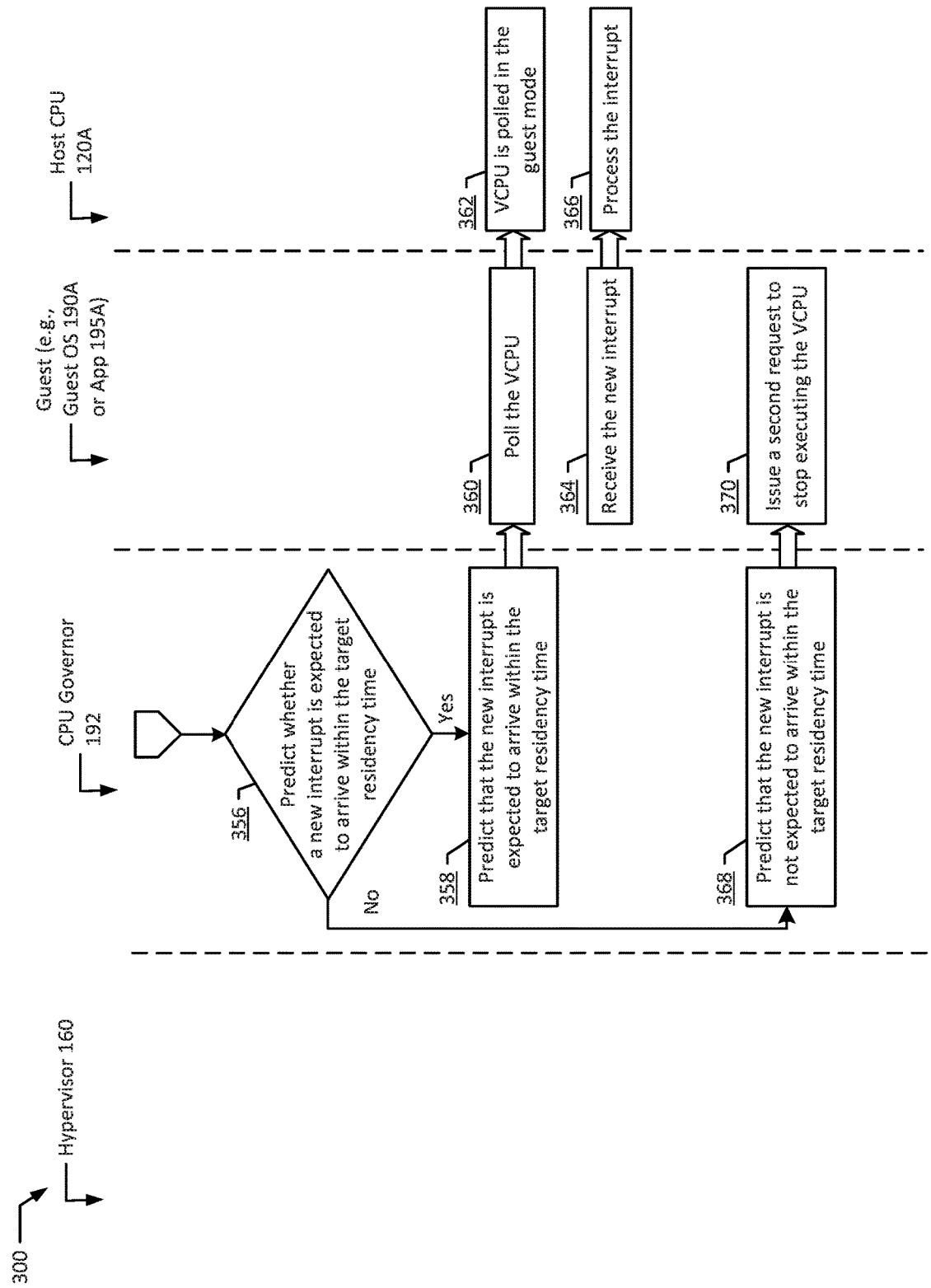

FIGS. 3A, 3B, and 3C illustrate a flow diagram of an example method 300 for predictive virtual machine halt according to an example of the present disclosure. Although the example method 300 is described with reference to the flow diagram illustrated in FIGS. 3A, 3B, and 3C, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. For example, the method 300 may be performed by a system including hypervisor 160, CPU governor 192, a guest (e.g., Guest OS 190A or App 195A-B), and host CPU 120A communicating or interacting with each other.

In the illustrated example, a hypervisor 160 may boot a guest of a virtual machine 170A (blocks 302 & 304). As used herein, a guest may refer to any software running within the virtual machines (e.g., VM 170A-B), such as guest operating systems (e.g., guest OS 190A-B) and/or applications running on the guest operating systems (e.g., Applications 195A-D), and/or may refer to guest firmware running within the virtual machines (e.g., VM 170A-B). Then, the guest may load a CPU governor 192 in the virtual machine 170A (blocks 306 & 308). In an example, the guest may load the CPU governor 192 during the boot of the guest. In another example, the guest may load the CPU governor 192 on demand and/or at any other suitable time. In an example, the CPU governor 192 may prevent the guest from sending a request to halt the VCPU to the hypervisor 160 when a new interrupt is expected to arrive within a target residency time (e.g., 6 μs).

At a later time after the CPU governor 192 is loaded, the hypervisor may start executing a VCPU 175A of the virtual machine 170A on a host CPU 120A (blocks 310 & 312). At a later time after the VCPU 175A started executing on the host CPU 120A, the VCPU 175A may become idle (block 314). When the CPU governor 192 detects that the VCPU 175A has entered into an idle state, the CPU governor 192 may predict whether a new interrupt is expected to arrive within a target residency time (block 316). If the CPU governor 192 predicts that the new interrupt is expected to arrive within the target residency time (block 318), the guest may poll the VCPU 175A (block 320). Then, the VCPU 175A may be polled while the host CPU 120A stays in a guest mode (block 322). If no interrupt arrives within the target residency time (block 323), the guest may issue a request to stop executing the VCPU 175 to the hypervisor 160 (e.g., HLT instruction) (block 326).

Referring back to block 316, if the CPU governor 192 predicts that the new interrupt is not expected to arrive within the target residency time (block 324), the guest may issue a request to stop executing the VCPU 175 to the hypervisor 160 (block 326). If the guest issues the request to stop executing the VCPU 175 to the hypervisor 160 at block 326, the host CPU 120A may switch from a guest mode to a hypervisor mode (block 328). That is, the hypervisor 160 may be configured in a way that when a guest issues a VCPU halt instruction, it causes an exit to the hypervisor, switching from the guest mode to the hypervisor mode. Then, the hypervisor 160 may detect the request to stop executing the VCPU 175A (block 330).

In an example, the hypervisor 160 may determine whether the CPU governor 192 is loaded (block 332). If the hypervisor 160 determines that the CPU governor 192 is loaded in the virtual machine 170A, the hypervisor 160 may start a timer, which is associated with the host CPU 120A (block 334). In an example, a predetermined amount of time may be set in the timer. In an example, the hypervisor 160 may determine the predetermined amount of time heuristically based on the target residency time of the CPU governor 192. In an example, the hypervisor 160 may be configured to set the predetermined amount of time to be shorter than the target residency time. In another example, the hypervisor 160 may be configured to set the predetermined amount of time to be equal to or greater than the target residency time. In an example, the target residency time may vary among the host CPUs 120A-C, and the target residency time of each of the host CPUs 120A-C may be stored in a static table in the hypervisor memory 165. In an example, the target residency time may be set based on the VM exit and entry times of the subject host CPU or the power state of the subject host CPU. For example, if the VM exit and entry times of the host CPU 120A are longer than the VM exit and entry times of the host CPU 120B, the target residency time of the host CPU 120A may be longer than the target residency time of the host CPU 120B.

When determining the predetermined amount of time heuristically, the hypervisor 160 may read the target residency time of the target host CPU stored in the static table. In an example, the predetermined amount of time set in the timer may be the target residency time minus a virtual machine entry time. In another example, the predetermined amount of time set in the timer may be the target residency time minus a virtual machine exit time and a virtual machine entry time.

In an example, the target residency time may be a few microseconds (e.g., in a range of about 0.5 μs to about 10 μs, preferably in a range of about 1 μs to about 5 μs, more preferably in a range of about 2 μs to about 3 μs). In another example, the target residency may be any other time suitable for the subject host CPU. In an example, the VM exit time and/or the VM entry time may be in a range of about 0.1 μs to about 5 μs, preferably in a range of about 0.5 μs to about 3 μs, more preferably in a range of about 0.7 μs to about 1.5 μs. In another example, the VM exit time and/or the VM entry time may have any other suitable time period depending on, for example, a particular hardware configuration of the subject host CPU.

Then, the hypervisor 160 may stop executing the VCPU 175A (blocks 336 & 338) and start executing a task on the host CPU 120A while the timer is running (blocks 340 & 342). Examples of the task may include, but may not be limited to, another VCPU (e.g., VCPU 175B) or a disk task. At a later time, the hypervisor 160 may detect an expiration of the timer (block 344). Then, the hypervisor 160 may stop executing the task running on the host CPU 120A (blocks 346 & 348). Then, the hypervisor may restart executing the VCPU 175A on the host CPU 120A (blocks 350 & 352). In an example, the predetermined amount of time set in the timer may be determined based on the target residency time and the VM exit/entry time such that the host CPU 120A may be able to reenter the VM 170A within the target residency time.

Referring back to block 332, if the hypervisor 160 determines that the CPU governor for the VM 170 is not loaded currently, the hypervisor 160 may disable the timer and may execute another task (e.g., another VCPU 175B) on the host CPU 120A without starting the timer this time.

At a later time after re-executing the VCPU 175A on the host CPU 120A, the VCPU 175A may become idle again. Then, the CPU governor 192 may detect that the VCPU 175A is idle (block 354). Then, the CPU governor 192 may predict whether a new interrupt is expected to arrive within the target residency time (block 356). If the CPU governor 192 predicts that the new interrupt is expected to arrive within the target residency time (block 358), the guest may poll the VCPU 175A (block 360). Then, the VCPU 175A may be polled while the host CPU 120A stays in the guest mode (block 362). If the new interrupt arrives while the guest is polling the VCPU 175A (block 364), the host CPU 120A may process the interrupt (block 366).

Referring back to block 356, if the CPU governor 192 predicts that the new interrupt is not expected to arrive within the target residency time again (block 368), the guest may issue a second request to stop executing the VCPU 175 to the hypervisor 160 (block 370). In an example, after block 370, the steps described in blocks 328-352 may be repeated. In another example, after block 370, the hypervisor 160 may disable the timer and determine to execute another task (e.g., another VCPU 175B) on the host CPU 120A without starting the timer this time, for example, after determining that there would be no event or interrupt periodically coming for the guest of the virtual machine 170A for a while (e.g., 125 µs). In an example, the guest may unload the CPU governor 192 at a later time after the CPU governor 192 was loaded, for example, after it is determined that there would be no event or interrupt periodically coming for the guest of the virtual machine 170A for a while. Then, the timer may be also disabled after the CPU governor 192 is unloaded.

In an example, the hypervisor 160 may start the timer when detecting the request to stop executing the VCPU regardless of whether the CPU governor 192 is loaded or not. In an example, the system may include an extra logic, other than the CPU governor 192, attempting to predict or estimate when an interrupt will arrive for a given VCPU or the frequency of the events. The predetermined amount of time may be determined based on this prediction, for example, heuristically. For example, the hypervisor 160 may be configured to determine the predetermined amount of time to be shorter than the predicted time or the interval of the frequency of the events. In an example, this extra logic may be located either in the hypervisor 160 or the guest. For example, this extra-logic may be the module in a hypervisor performing the halt-polling technique. In another example, this extra logic may be located in any other suitable places in the system (e.g., any hardware or software components).

Figure 4:
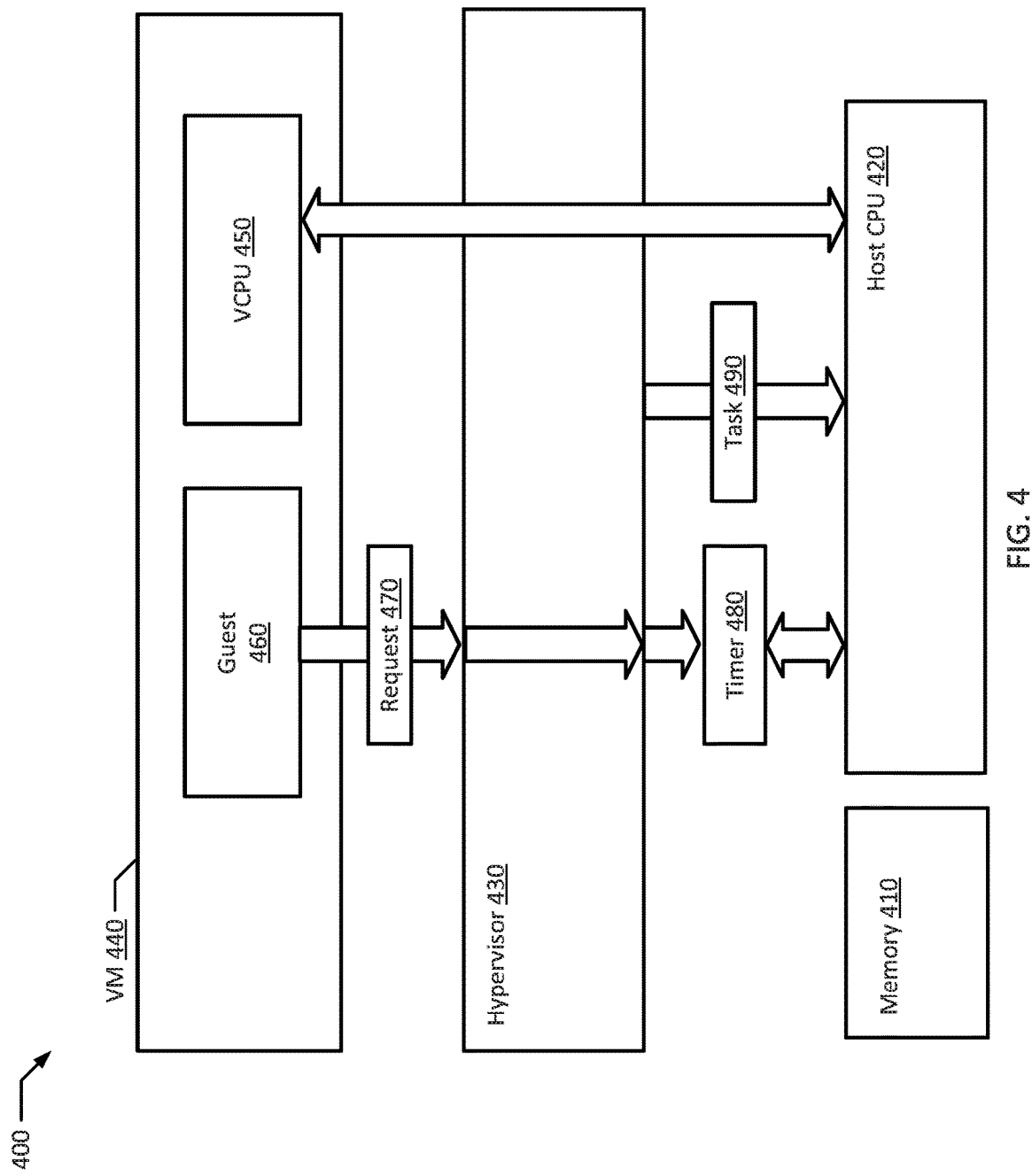
FIG. 4 is a block diagram of an example computer system according to an example of the present disclosure.

FIG. 4 shows a block diagram of an example system according to an example of the present disclosure. As illustrated in FIG. 4, an example system 400 includes a memory 410, a host central processing unit (CPU) 420 in communication with the memory 410, a hypervisor 430 executing on the host CPU 420, and a virtual machine 440 executing on the hypervisor 430. The virtual machine 440 includes a virtual central processing unit (VCPU) 450 and a guest 460. In an example, the hypervisor 430 starts executing the VCPU 450 on the host CPU 420. When the hypervisor 430 detects a request 470 to stop executing the VCPU 450 from the guest 460, the hypervisor 430 starts a timer 480 associated with the host CPU 420 with a predetermined amount of time set in the timer 480. Then, the hypervisor 430 stops executing the VCPU 450 and starts executing a task 490 on the host CPU 420 while the timer 480 is running. When the hypervisor 430 detects an expiration of the timer 480, the hypervisor 430 stops executing the task 490 on the host CPU 420. Then, the hypervisor 430 restarts executing the VCPU 450 on the host CPU 420. Accordingly, the presently disclosed system may increase the chance that an interrupt will arrive while the VCPU is running on host CPU, reducing the number of VM exits or VM entries, particularly when the events are coming at low frequency.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a host central processing unit (CPU) in communication with the memory;
a hypervisor executing on the host CPU;
a virtual machine executing on the hypervisor;
a virtual central processing unit (VCPU) in the virtual machine; and
a guest in the virtual machine,
wherein the hypervisor:
starts executing the VCPU on the host CPU;
detects a request to stop executing the VCPU from the guest;
responsive to detecting the request, starts a timer associated with the host CPU, wherein a predetermined amount of time is set in the timer;
stops executing the VCPU;
starts executing a task on the host CPU while the timer is running;
detects an expiration of the timer;
responsive to the expiration of the timer, stops executing the task on the host CPU; and restarts executing the VCPU on the host CPU,
wherein the system further comprises a CPU governor in the virtual machine, wherein the CPU governor includes an instruction which, when executed, predicts whether a new interrupt is expected to arrive within a target residency time.

2. The system of claim 1, wherein the guest polls the VCPU based on a prediction that the new interrupt is expected to arrive within the target residency time.

3. The system of claim 1, wherein the guest issues the request to stop executing the VCPU to the hypervisor based on a prediction that the new interrupt is not expected to arrive within the target residency time.

4. The system of claim 1, wherein the hypervisor determines the predetermined amount of time heuristically based on the target residency time, which is longer than the predetermined amount of time.

5. The system of claim 4, wherein the hypervisor reads the target residency time of the host CPU stored in a static table in hypervisor memory when determining the predetermined amount of time heuristically.

6. The system of claim 1, wherein the predetermined amount of time set in the timer is the target residency time minus a virtual machine entry time.

7. The system of claim 1, wherein the hypervisor:
responsive to detecting the request to stop executing the VCPU from the guest, determines whether the CPU governor of the virtual machine is loaded; and
responsive to determining that the CPU governor is loaded, starts the timer.

8. The system of claim 1, further comprising an advanced programmable interrupt controller virtualization (APICv) module in the host CPU.

9. The system of claim 1, wherein the task is a second VCPU in a second virtual machine.

10. A method comprising:
starting, by a hypervisor executing on a host central processing unit (CPU) in communication with a memory, executing a virtual central processing unit (VCPU) of a virtual machine on a host CPU, wherein the virtual machine executing on the hypervisor includes a guest;
detecting, by the hypervisor, a request to stop executing the VCPU from the guest;
responsive to detecting the request, starting, by the hypervisor, a timer associated with the host CPU, wherein a predetermined amount of time is set in the timer;
stopping, by the hypervisor, executing the VCPU;
starting, by the hypervisor, executing a task on the host CPU while the timer is running;
detecting, by the hypervisor, an expiration of the timer;
responsive to the expiration of the timer, stopping, by the hypervisor, executing the task on the host CPU; and
restarting, by the hypervisor, executing the VCPU on the host CPU,
wherein the virtual machine includes a CPU governor, wherein the CPU governor includes an instruction which, when executed, predicts whether a new interrupt is expected to arrive within a target residency time.

11. The method of claim 10, further comprising polling, by the guest, the VCPU based on a prediction that the new interrupt is expected to arrive within the target residency time.

12. The method of claim 10, further comprising issuing, by the guest, the request to stop executing the VCPU to the hypervisor based on a prediction that the new interrupt is not expected to arrive within the target residency time.

13. The method of claim 10, further comprising, determining, by the hypervisor, the predetermined amount of time heuristically based on the target residency time, which is longer than the predetermined amount of time.

14. The method of claim 13, further comprising reading, by the hypervisor, the target residency time of the host CPU stored in a static table in hypervisor memory when determining the predetermined amount of time heuristically.

15. The method of claim 10, wherein the predetermined amount of time set in the timer is the target residency time minus a virtual machine entry time.

16. The method of claim 10, further comprising:
responsive to detecting the request to stop executing the VCPU from the guest, determining, by the hypervisor, whether the CPU governor of the virtual machine is loaded; and
responsive to determining that the CPU governor is loaded, starting, by the hypervisor, the timer.

17. The method of claim 10, wherein the host CPU includes an advanced programmable interrupt controller virtualization (APICv) module.

18. A non-transitory machine-readable medium storing instructions, which when executed by a host central processing unit (CPU), cause the host CPU to:
start, by a hypervisor executing on the host CPU, executing a virtual central processing unit (VCPU) of a virtual machine on the host CPU, wherein the virtual machine executing on the hypervisor includes a guest;
detect, by the hypervisor, a request to stop executing the VCPU from the guest;
responsive to detecting the request, start, by the hypervisor, a timer associated with the host CPU, wherein a predetermined amount of time is set in the timer;
stop, by the hypervisor, executing the VCPU;
start, by the hypervisor, executing a task on the host CPU while the timer is running detect, by the hypervisor, an expiration of the timer;
responsive to the expiration of the timer, stop, by the hypervisor, executing the task on the host CPU; and
restart, by the hypervisor, executing the VCPU on the host CPU,
wherein the virtual machine includes a CPU governor, wherein the CPU governor includes an instruction which, when executed, predicts whether a new interrupt is expected to arrive within a target residency time.

* * * * *